(12) United States Patent
Osika et al.

(10) Patent No.: US 7,357,967 B2
(45) Date of Patent: Apr. 15, 2008

(54) CONTAINER HAVING FLUORESCENT INDICIA

(75) Inventors: Louis S. Osika, Orland Park, IL (US); Roger P. Smith, Perrysburg, OH (US)

(73) Assignee: Owens-Illinois Prescription Products Inc., Perrysburg, OH (US)

( * ) Notice: Subject to any disclaimer, the term of this patent is extended or adjusted under 35 U.S.C. 154(b) by 490 days.

(21) Appl. No.: 10/789,875

(22) Filed: Feb. 27, 2004

(65) Prior Publication Data

US 2005/0191451 A1 Sep. 1, 2005

(51) Int. Cl.
*B29D 2/00* (2006.01)
*B29D 23/00* (2006.01)
*B32B 1/08* (2006.01)

(52) U.S. Cl. .................... 428/35.7; 428/29; 428/542.8; 428/36.91; 264/241; 264/259

(58) Field of Classification Search ............... 428/35.7, 428/36.9, 36.91, 36.92, 36.7, 542.8, 29; 264/241, 259
See application file for complete search history.

(56) References Cited

U.S. PATENT DOCUMENTS

| | | | |
|---|---|---|---|
| 3,474,498 A | 10/1969 | Hoppes | |
| 3,550,197 A | 12/1970 | Szajna et al. | |
| 4,475,661 A | 10/1984 | Griffin | |
| 4,609,516 A | 9/1986 | Krishnakumar et al. | |
| 4,710,118 A | 12/1987 | Krishnakumar et al. | |
| 4,769,310 A | 9/1988 | Gugger et al. | |
| 4,802,295 A | 2/1989 | Darr | |
| 4,954,376 A | 9/1990 | Krishnakumar et al. | |
| 5,135,569 A | 8/1992 | Mathias | |
| 5,464,107 A | 11/1995 | Koeniger | |
| 5,605,230 A | 2/1997 | Marino, Jr. et al. | |
| 5,685,451 A | 11/1997 | Newby, Sr. | |
| 5,982,282 A | 11/1999 | Ryan, Jr. | |
| 6,123,893 A | 9/2000 | Newby, Sr. | |
| 6,196,828 B1 | 3/2001 | Newby, Sr. | |
| 6,226,619 B1 | 5/2001 | Halperin et al. | |
| 6,301,767 B1 | 10/2001 | Granger et al. | |
| 6,341,712 B1 | 1/2002 | Huang | |
| 6,394,022 B1 | 5/2002 | Johnston et al. | |
| 2003/0038044 A1 | 2/2003 | Draghetti | |
| 2003/0061706 A1 | 4/2003 | Smeyak et al. | |
| 2003/0091769 A1* | 5/2003 | Slat et al. .................. | 428/35.7 |
| 2003/0211288 A1* | 11/2003 | Schottland .................. | 428/156 |

FOREIGN PATENT DOCUMENTS

| | | |
|---|---|---|
| EP | 0066345 | 12/1982 |
| EP | 0341699 | 11/1989 |

(Continued)

*Primary Examiner*—Michael Miggins
(74) *Attorney, Agent, or Firm*—Reising, Ethington, Barnes, Kisselle, P.C.

(57) ABSTRACT

A method of making an identifiable article such as a container or container preform. A molded plastic container or container preform is provided that includes a wall having at least one layer of matrix resin and at least one layer of barrier resin that is blended with an additive. The wall has at least one localized portion of predetermined geometry in which the barrier layer is thicker than surrounding portions of the wall, and within which the additive is discernable under visible or UV light so as to provide a means to prevent use of counterfeit containers.

6 Claims, 1 Drawing Sheet

FOREIGN PATENT DOCUMENTS

| | | |
|---|---|---|
| EP | 0379795 | 8/1990 |
| EP | 0481818 | 4/1992 |
| EP | 1191317 | 3/2002 |
| GB | 2348414 | 10/2000 |
| WO | 9207769 | 5/1992 |
| WO | 9804464 | 2/1998 |
| WO | WO98/04464 * | 2/1998 |

* cited by examiner

CONTAINER HAVING FLUORESCENT INDICIA

The present invention is directed to hollow plastic containers; and more particularly to a hollow plastic container having fluorescent indicia as an identifiable security measure to combat use of counterfeit containers.

BACKGROUND AND SUMMARY OF THE INVENTION

In the production of hollow plastic containers it is common to injection mold a preform and then blow mold the preform to achieve the final shape of a container. Typically, at least a body portion of the container is of multilayer construction in which one or more intermediate layers form a barrier against gas transmission through the container. Such multilayer blow molded containers are often used for medical-type products such as pharmaceuticals. Unfortunately, however, pharmaceuticals are sometimes counterfeited and packaged in counterfeit containers that look identical to genuine containers used to market genuine pharmaceuticals. Accordingly, such counterfeit containers are used to deceive pharmacists and consumers into buying counterfeit pharmaceuticals.

In accordance with one aspect of the present invention, a multilayer molded plastic container has a sidewall with at least one and preferably two layers of matrix resin, and at least one intermediate resin layer. In the preferred embodiments of the invention, the intermediate layer(s) are of barrier resin polymer to retard migration of gases, water vapor or flavorants through the container sidewall. However, as will be described, the intermediate layer resin can be of any suitable type, including the same resin as the matrix resin layer(s). In accordance with this first aspect of the invention, an additive is placed in the intermediate resin layer(s) to render the intermediate resin layer(s) visible, either directly or under ultraviolet light. The container sidewall is provided with at least one region or area in which the thickness of the intermediate layer(s) is greater than in other areas of the sidewall. This preferably is accomplished by providing one or more bulges or thickened areas in the sidewall, in which a major portion of the increased sidewall thickness is due to an increased thickness of the intermediate layer(s). In these thickened areas, the apparent density of the additive in the intermediate layer(s) is greater as viewed from outside the sidewall, so that the thickened areas form a visible watermark-like appearance in the sidewall. In the preferred embodiments of the invention, the additive is a fluorescent material that becomes visible under ultraviolet light, or pieces of reflective material such as mica flakes that become visible by reflecting visible light.

In accordance with another aspect of the invention, a method of making a plastic container includes molding a preform having a multilayer construction in at least a portion of the preform sidewall, and then blow molding the body of the preform to form the container. The preform is molded to have at least one radially outwardly extending bulge in its sidewall, in which intermediate sidewall layer(s) account for a major portion of the increased thickness. When the preform body is blow molded, the bulge extends radially inwardly from the container wall. An additive in the intermediate layer in the bulge in the container sidewall becomes visible as watermark-like indicia under ultraviolet or visible radiation, providing identifying information associated with the container.

The multilayer container and preform preferably have N matrix layers (e.g., two or three) and N−1 intermediate layers (e.g., one or two). The matrix layers may be of any suitable resin, such as polyethylene terephthalate (PET) or polycarbonate. The intermediate layer(s) preferably are of barrier resin construction, such as ethylene vinyl alcohol (EVOH) or nylon. However, as recited above, the intermediate layer could also be of PET or polycarbonate in accordance with the broadest aspects of the invention inasmuch as it is the additive in the intermediate layer(s) that provides the distinguishing feature of the invention.

BRIEF DESCRIPTION OF THE DRAWINGS

The invention, together with additional objects, features, advantages and aspects thereof, will be best understood from the following description, the appended claims and the accompanying drawings, in which:

DETAILED DESCRIPTION OF PREFERRED EMBODIMENTS

Figure 1:
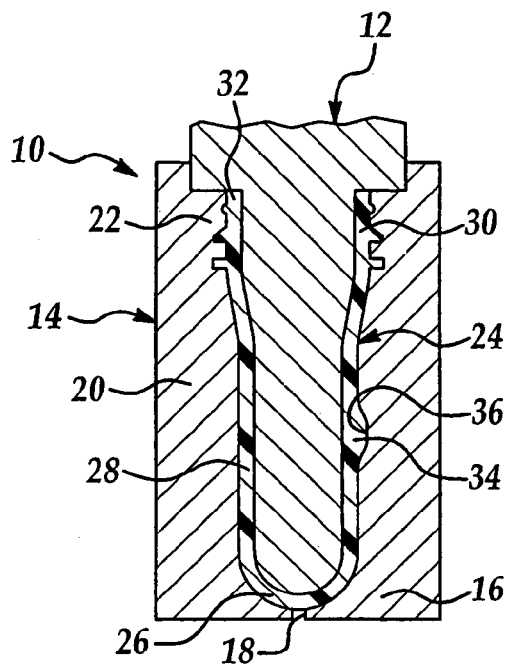
FIG. 1 illustrates a cross-sectional side elevation view of an exemplary injection molding apparatus used in a method according to an embodiment of the present invention in which a multilayer preform material is injection molded within a mold cavity.

FIG. 1 illustrates an exemplary injection molding apparatus 10 that is used to carry out a method of the present invention for producing an article according to the present invention. The injection molding apparatus and method preferably are substantially similar to those disclosed in U.S. Pat. Nos. 4,710,118, 4,609,516 and 4,954,376, except for the inventive features of the present invention, which will be described in detail below. Accordingly, U.S. Pat. Nos. 4,710,118, 4,609,516, and 4,954,376 are all incorporated by reference herein.

The injection molding apparatus 10 includes a core pin 12 positioned within an injection mold cavity 14. The injection mold cavity 14 includes a closed bottom end 16 having an injection port 18, a body portion 20, and a finish portion 22 that define a mold cavity into which multiple molten resins are injected to produce a preform 24. The preform 24 includes a closed bottom end 26, a body portion or sidewall 28 extending from the closed bottom end 26, and a finish portion 30 terminating the sidewall 28 and having an open top end 32 opposite of the closed bottom end 26. The sidewall 28 includes at least one localized portion of pre-determined geometry, such as a bulge or enlarged portion 34, which is thicker than surrounding portions of the sidewall 28. The enlarged portion 34 may be of any suitable desired indicia including any geometric shape, logo, text, or the like. The enlarged portion 34 extends radially outwardly and is produced by providing a radially outwardly extending pocket 36 in the body portion 20 of the injection mold cavity 14. As will be discussed in more detail below with regard to FIG. 2A, the pocket 36 is sized such that the sidewall 28 will be thicker in the localized enlarged area 34 of the pocket 36 than in the rest of the sidewall 28.

Figure 2:
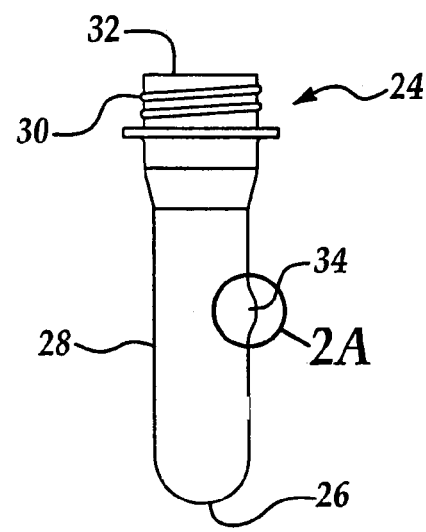
FIG. 2 illustrates a side elevational view of a pre-form according to an embodiment of the present invention that is produced by the apparatus of FIG. 1 and according to the method of the present invention.

FIG. 2 illustrates the preform 24 produced by the apparatus of 1 having the closed bottom end 26, the sidewall 28 extending from the closed bottom end 26, and the finish portion 30 terminating the sidewall 28 and having the open top end 32 opposite of the closed bottom end 26. The enlarged portion 34 of the preform 24 is better depicted in the cross-sectional view thereof in FIG. 2A.

Figure 2A:
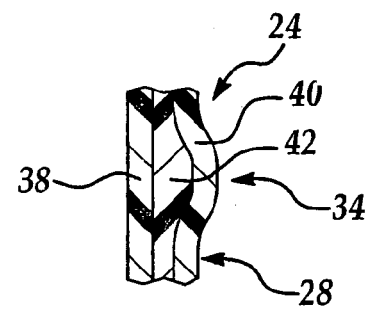
FIG. 2A illustrates an enlarged cross-sectional view of a sidewall of the pre-form of FIG. 2 taken from circle 2A thereof.

In FIG. 2A it can be seen that the sidewall 28 is multilayered from multiple molten resins to include inside and outside layers 38, 40 that are composed of a matrix resin and an intermediate layer 42 that preferably is composed of a barrier resin. It is contemplated that the multilayered sidewall 28 could include more or fewer layers without departing from the scope of the present invention. In any event, it is an inherent feature of the layer sequential injection molding process and apparatus disclosed in the above-referenced patents that the barrier layer 42 will be thicker in the enlarged area 34 of the sidewall 28 than in other areas of the sidewall 28, while the inside and outside layers 38, 40 will remain of substantially uniform thickness throughout the sidewall 28 including the enlarged area 34.

Figure 3:
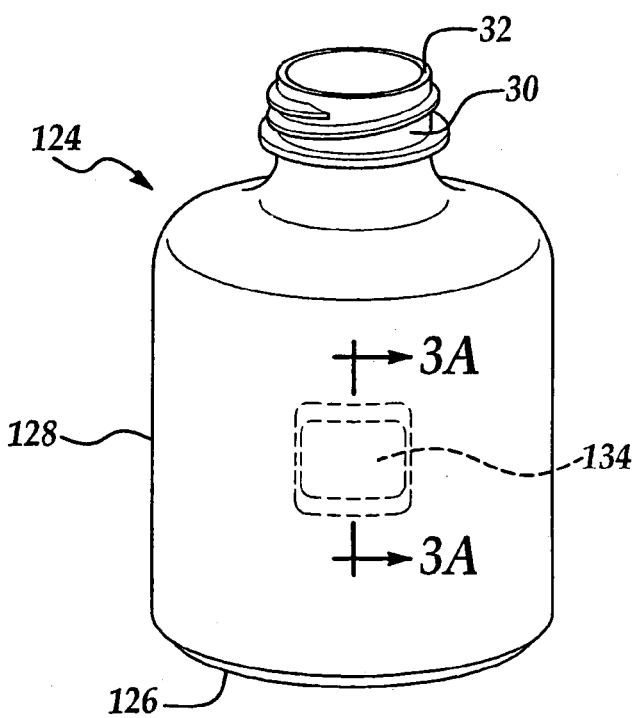
FIG. 3 illustrates a side elevational view of a container blow molded from the pre-form of FIG. 2.

FIG. 3 illustrates a container 124 that is blow molded from the preform 24 of FIG. 2. The container 124 includes a closed bottom end 126, a sidewall 128 extending from the closed bottom end 126, and the finish portion 30 terminating the sidewall 128 and including the open top end 32 opposite of the closed bottom end 126. Like the preform 24 of FIG. 2, the container 124 of FIG. 3 includes at least one localized portion of predetermined geometry such as a bulge or enlarged portion 134. It is preferred that the preform be blown against a smooth mold wall, so that the enlargement or bulge 34 extends radially inwardly from the container sidewall. Sidewall 128, including enlargement 34 preferably is clear and transparent.

Figure 3A:
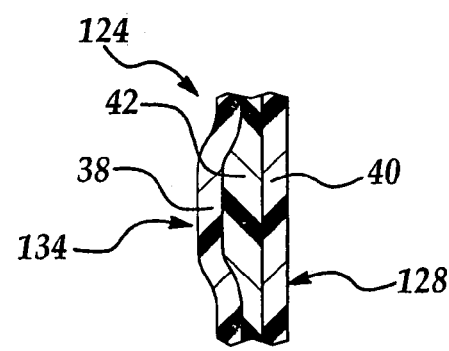
FIG. 3A illustrates an enlarged cross-sectional view of a sidewall of the container of FIG. 3 taken along line 3A-3A.

FIG. 3A better depicts the enlarged portion 134 in the sidewall 128 of the container 124 as multilayered from the multiple molten resins, to include the inside and outside layers 38, 40 that are composed of the matrix resin and the intermediate layer 42 that is preferably composed of the barrier resin. The matrix resin and layers 38, 40 are preferably composed of polycarbonate polymer, but may be composed of any other desired container material. The resin in layer 42 preferably is composed of a nylon or EVOH polymer, but may be composed of any other suitable barrier or other resin material used for containers.

An additive is added to the intermediate layer resin and is used as a unique identifier to make counterfeiting of the container 124 more difficult. The additive may be a material that is particularly discernable under ultraviolet light such as a fluorescing material. Examples of fluorescing materials include: Blankophor® DML from Bayer Corporation; Keyfluor invisible yellow pigment 915-549-50, and Keyfluor invisible green 915-505-50 from Keystone Aniline Corporation of Chicago, Ill.; fluorescent pink COP MB LR99111, fluorescent green COP MB LR99098, and fluorescent orange COP MB LR99113 from Ampacet Corporation of Tarrytown, N.Y. The fluorescing materials are powders that are compounded into master batch pellets. The additive alternatively may be a material that is particularly discernable or reflective under visible light, such as dyes or tinted pigments, and reflective metallic or mineral flakes, such as mica flakes. Accordingly, the additive and the thicker sidewall 128 at the enlarged portion 134 of the container 124 combine to provide a pronounced localized accumulation of identifying material in a discrete area, to thereby more uniquely identify the container 124, either under exposure to visible light or ultraviolet light. In other words, the present invention thus provides an overt security feature in the form of a kind of "watermark" in the sidewall 128 of the container 124.

Accordingly, a "genuine" preform and/or container 24, 124 of the present invention bearing such a watermark can be more readily distinguished from a non-genuine container not bearing such a watermark. Regardless if the container 24, 124 is empty or full of product, the watermark will be visible, although relatively less visible when the container 24, 124 is full with relatively heavy pigmented product. The watermarked container is difficult for counterfeiters to reproduce and indicates the authenticity of the product packaged therein. Thus, by using the present invention, pharmacists and consumers are relatively more protected against the intrusion of counterfeit pharmaceuticals into the marketplace.

There have thus been described an article and method of producing the article that fully satisfy all of the objects and aims previously set forth. The present invention has been disclosed in conjunction with presently preferred embodiments thereof, and a number of modifications and variations have been discussed. Other modifications and variations will readily suggest themselves to persons of ordinary skill in the art in view of the foregoing description. For example, the invention has been disclosed in conjunction with a unique identifier in a sidewall of a container. However, the unique identifier can be produced in any location on a container, such as the closed bottom end or the finish portion without departing from the disclosure. Furthermore, the invention has been disclosed in conjunction with a container; however other implementations are contemplated such as a closure for a container. Also, the term container is defined herein as including a container preform or even a closure for a container. The term pronounced is broadly defined herein to include an enlarged or thickened portion, or otherwise relatively more visibly marked portion compared to surrounding portions. Furthermore, the term indicia is broadly defined herein to include anything that provides a visible indication in one or more types of light. Indeed, the invention is intended to embrace all modifications and variations as fall within the spirit and broad scope of the appended claims.

The invention claimed is:

1. A molded plastic container or container preform having a wall with at least one matrix resin layer and at least one intermediate resin layer, said intermediate resin being blended with an additive, said wall having at least one localized portion of predetermined logo geometry that is thicker than surrounding portions of said wall, within which said intermediate resin layer is thicker than in surrounding portions of said wall and within which said additive is discernable.

2. The container or preform set forth in claim 1 wherein said additive is selected from the group consisting of dyes, UV fluorescing agents and reflective metallic or mineral flakes.

3. The container or preform set forth in claim 1 wherein said container or preform includes a sidewall and said at least one localized portion is formed in said sidewall.

4. A method of making an identifiable container or preform, which includes:

providing a molded plastic container or container preform that includes a wall having at least one matrix resin layer and at least one intermediate layer of resin blended with an additive, said wall having at least one localized portion of predetermined logo geometry that is thicker than surrounding portions of said wall and within which said additive is discernable under visible or UV light.

5. The method set forth in claim 4 wherein said step of providing said molded plastic container or preform comprises molding said portion of predetermined geometry into said wall.

6. A container or preform produced by the method of claim 4.

* * * * *